US012619436B2

(12) United States Patent (10) Patent No.: US 12,619,436 B2
Kwon et al. (45) Date of Patent: May 5, 2026

(54) APPARATUS AND OPERATION METHOD FOR DISTRIBUTED PROCESSING OF PLURAL OPERATIONS IN DATA STORAGE SYSTEM

(71) Applicant: SK hynix Inc., Gyeonggi-do (KR)

(72) Inventors: Ku Ik Kwon, Gyeonggi-do (KR); Byoung Min Jin, Gyeonggi-do (KR); Gyu Yeul Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 79 days.

(21) Appl. No.: 18/516,419

(22) Filed: Nov. 21, 2023

(65) Prior Publication Data

US 2025/0004779 A1 Jan. 2, 2025

(30) Foreign Application Priority Data

Jun. 30, 2023 (KR) ......................... 10-2023-0085273

(51) Int. Cl.
G06F 9/50 (2006.01)
G06F 9/38 (2018.01)
G06F 9/48 (2006.01)

(52) U.S. Cl.
CPC .......... G06F 9/3838 (2013.01); G06F 9/4881 (2013.01)

(58) Field of Classification Search
CPC .............................. G06F 9/3838; G06F 9/4881
See application file for complete search history.

(56) References Cited

U.S. PATENT DOCUMENTS

| | | | | |
|---|---|---|---|---|
| 4,112,489 | A * | 9/1978 | Wood ...................... | G06F 9/384 712/E9.039 |
| 5,944,814 | A * | 8/1999 | McCulloch ............ | H04H 60/04 712/15 |
| 7,484,078 | B2 * | 1/2009 | Bink ..................... | G06F 9/3856 712/218 |
| 7,805,592 | B2 * | 9/2010 | Joyce .................... | G06F 9/3804 712/207 |
| 7,882,312 | B2 * | 2/2011 | Spencer ................. | H04L 47/32 710/240 |
| 8,466,921 | B2 * | 6/2013 | Achiwa ................... | G06F 9/505 345/502 |
| 9,152,427 | B2 * | 10/2015 | Vorbach ................. | G06F 9/381 |

(Continued)

FOREIGN PATENT DOCUMENTS

KR 10-1400286 B1 5/2014

OTHER PUBLICATIONS

Jerry Vanaken, The Expression Processor: a Pipelined, Multiple Processor Architecture, 1981, IEEE, vol. C-30, pp. 525-536. (Year: 1981).*

*Primary Examiner* — Cheng Yuan Tseng
(74) *Attorney, Agent, or Firm* — IP & T GROUP LLP

(57) ABSTRACT

A data storage system includes a controller comprising pipelined multiple processors. The controller is configured to: generate plural instructions having dependency based on a command, input from an external device, for controlling at least one storage device to perform an operation corresponding to the command; allocate the plural instructions to the pipelined multiple processors in stages; and reallocate, when a number of second instructions allocated to a second processor of the pipelined multiple processors becomes a first threshold or greater, at least one of the second instructions to a first processor of the multiple processors.

20 Claims, 9 Drawing Sheets

(56)                    References Cited

U.S. PATENT DOCUMENTS

| | | | |
|---|---|---|---|
| 9,262,098 B2 * | 2/2016 | Chung | G06F 3/0659 |
| 10,402,935 B2 * | 9/2019 | Foo | G06T 1/20 |
| 10,585,716 B2 * | 3/2020 | Knowles | G06F 13/1657 |
| 10,929,174 B2 * | 2/2021 | Daglis | G06F 9/528 |
| 11,789,733 B2 * | 10/2023 | Guan | G06F 9/3869 |
| | | | 712/200 |
| 2014/0317626 A1 * | 10/2014 | Chung | G06F 9/3888 |
| | | | 718/101 |
| 2014/0365547 A1 * | 12/2014 | Kim | G06F 17/142 |
| | | | 708/404 |
| 2019/0377580 A1 * | 12/2019 | Vorbach | G06F 9/30123 |
| 2023/0334614 A1 * | 10/2023 | Livesley | G06T 15/005 |
| 2023/0334748 A1 * | 10/2023 | Livesley | G06T 15/005 |

* cited by examiner

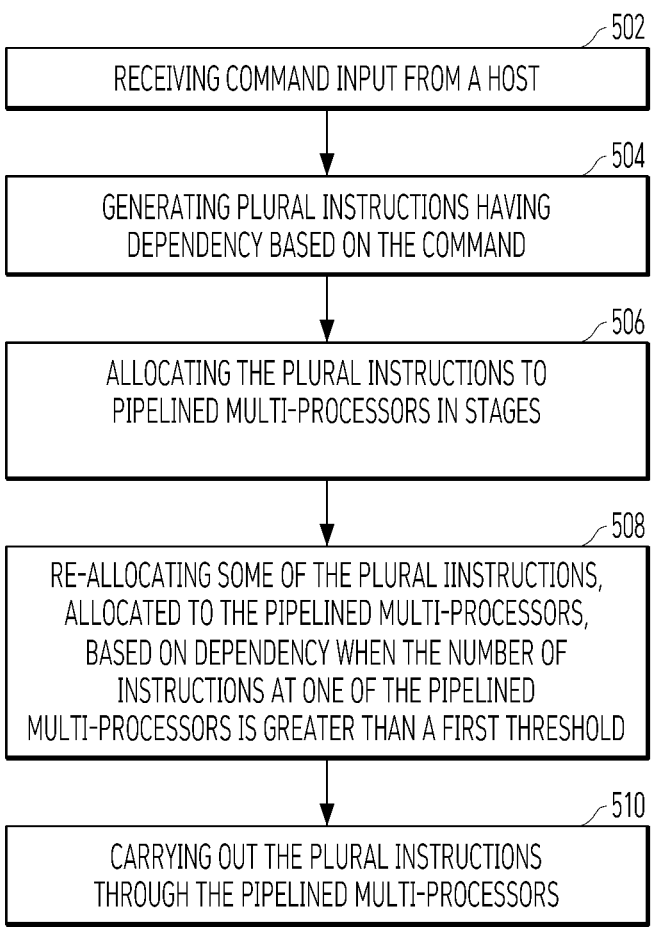

502
RECEIVING COMMAND INPUT FROM A HOST

504
GENERATING PLURAL INSTRUCTIONS HAVING
DEPENDENCY BASED ON THE COMMAND

506
ALLOCATING THE PLURAL INSTRUCTIONS TO
PIPELINED MULTI-PROCESSORS IN STAGES

508
RE-ALLOCATING SOME OF THE PLURAL IINSTRUCTIONS,
ALLOCATED TO THE PIPELINED MULTI-PROCESSORS,
BASED ON DEPENDENCY WHEN THE NUMBER OF
INSTRUCTIONS AT ONE OF THE PIPELINED
MULTI-PROCESSORS IS GREATER THAN A FIRST THRESHOLD

510
CARRYING OUT THE PLURAL INSTRUCTIONS
THROUGH THE PIPELINED MULTI-PROCESSORS

APPARATUS AND OPERATION METHOD FOR DISTRIBUTED PROCESSING OF PLURAL OPERATIONS IN DATA STORAGE SYSTEM

CROSS-REFERENCE TO RELATED APPLICATIONS

This patent application claims the benefit of priority under 35 U.S.C. § 119 (a) to Korean Patent Application No. 10-2023-0085273, filed on Jun. 30, 2023, the entire disclosure of which is incorporated herein by reference.

TECHNICAL FIELD

One or more embodiments of the present disclosure described herein relate to a data storage system, and more particularly, to an apparatus and a method for distributed processing to improve data input/output performance in the data storage system.

BACKGROUND

A memory device or a memory system is typically used as an internal circuit, a semiconductor circuit, an integrated circuit, and/or a removable device in a computing system or an electronic apparatus. There are various types of memory, including a volatile memory and a non-volatile memory. The volatile memory may require power to maintain data. The volatile memory may include a random access memory (RAM), a dynamic random access memory (DRAM), a static random access memory (SRAM), a synchronous dynamic random access memory (SDRAM), and the like. The non-volatile memory can maintain data stored therein when power is not supplied. The non-volatile memory may include a NAND flash memory, a NOR flash memory, a Phase Change Random Access Memory (PCRAM), a Resistant Random Access Memory (RRAM), a Magnetic Random Access Memory (MRAM), etc.

BRIEF DESCRIPTION OF THE DRAWINGS

The description herein makes reference to the accompanying drawings wherein like reference numerals refer to like parts throughout the figures.

FIG. 2 illustrates allocation of instructions to multiple processors having a pipelined structure according to an embodiment of the present disclosure.

FIG. 4 illustrates allocation of instructions according to another embodiment of the present disclosure.

FIG. 7 illustrates a data storage system according to an embodiment of the present disclosure.

FIG. 8 illustrates a method for operating a data storage system according to an embodiment of the present disclosure.

DETAILED DESCRIPTION

Figure 1:
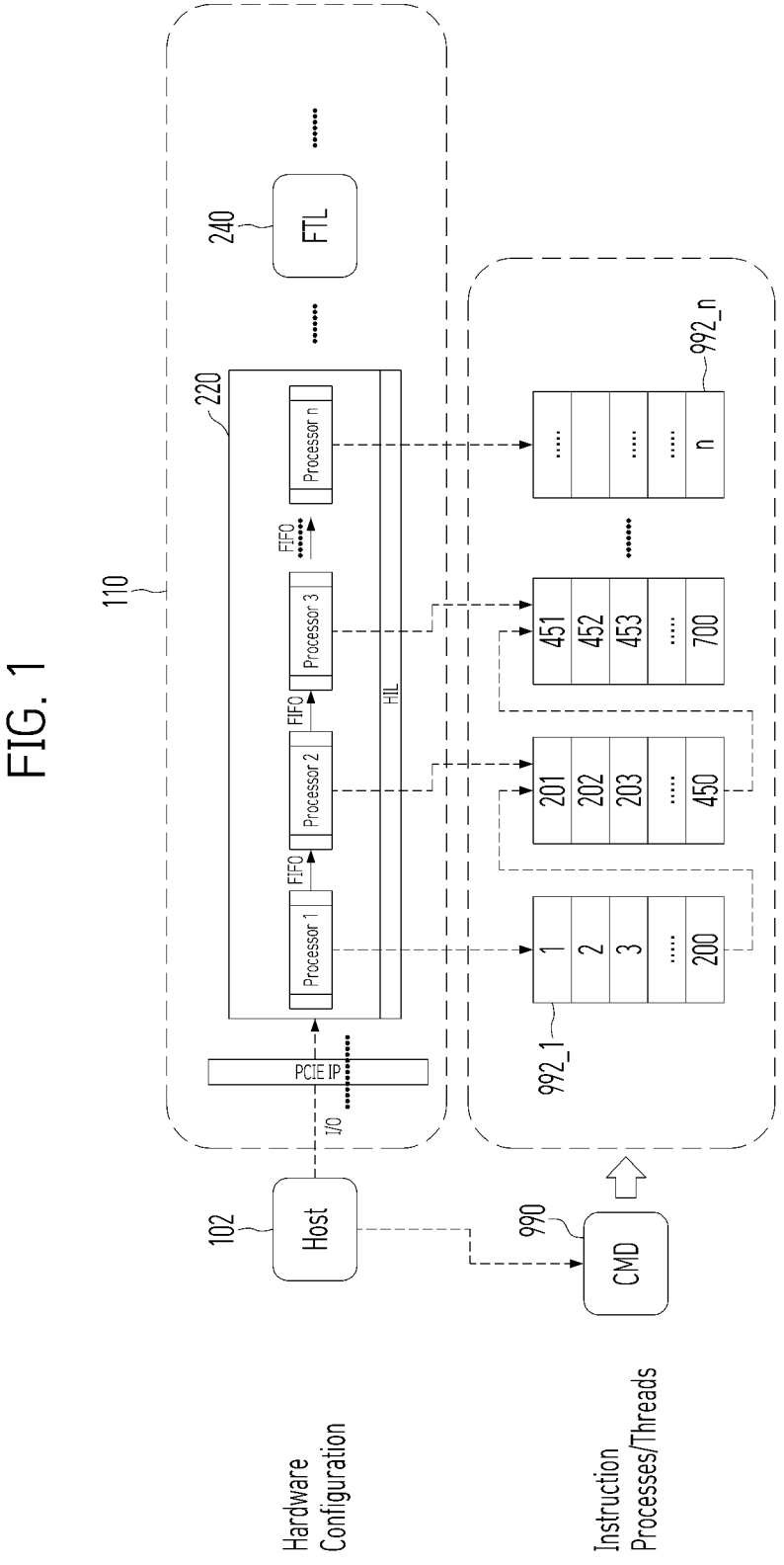
FIG. 1 illustrates a data storage system according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in a manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory (ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Embodiments of the present disclosure may provide a data storage device or a memory device, a data storage system including a controller configured to control the data storage device or the memory device, or a data processing system including a host and the data storage system.

An embodiment of the present disclosure can provide an apparatus and a method for improving performance of operations corresponding to a command input from an external device in a data storage system including multiple processors having a pipelined structure.

Within the patent terms such as "processor", "multiple processors," "multiple cores," or "plural processors" can be used. Those terms are related to multi-processor computer systems, which are typically multi-core single-chip processors or multi-core multi chip-processors, with the plurality of chips being mounted within one single package. According to an embodiment, multiple processors are preferably being built of a stack of processor chips, the stack may comprise other chip structures, such as static and/or dynamic memories.

This disclosure relates to systems, including hardware and/or software that can facilitate coherent sharing of data or instructions within multiple processor devices. The inventive pipelined structure may be extended beyond a single processor (which may comprise a plurality of processors/processor cores) and used for multi-processor systems, e.g. parallel computers (high performance computing) and/or multi-processor mainboards, as they are used, e.g., in server systems.

An embodiment of the present disclosure can provide an apparatus and a method for allocating plural instructions, performed by pipelined multiple processors included in a data storage system, in stages based on dependency between the plural instructions and adjusting reallocation of the plural instructions based on operating states of the pipelined multiple processors, so that substantially equal loads could be applied to each of the multiple processors.

An embodiment of the present disclosure can provide an apparatus and a method for accurately and efficiently executing plural instructions through pipeline interlocking or pipeline stalling during instruction offloading by changing levels of some instructions among the plural instructions based on dependency between the plural instructions generated in response to a command input from an external device.

An embodiment of the present disclosure can provide a data storage system including a controller. The controller can include pipelined multiple processors. The controller can be configured to: generate plural instructions having dependency based on a command, input from an external device, for controlling at least one storage device to perform an operation corresponding to the command; allocate the plural instructions to the pipelined multiple processors in stages; and reallocate, when a number of second instructions allocated to a second processor of the pipelined multiple processors becomes a first threshold or greater, at least one of the second instructions to a first processor of the multiple processors.

The pipelined multiple processors can include N number of processors, where N is equal to, or greater than 2. The N number of processors can be individually configured to carry out the plural instructions, allocated thereto, among the plural instructions according to N number of stages having the dependency.

The controller can include task monitoring circuitry configured to check N number of queues each configured to enqueue therein one or more instructions allocated to a corresponding processor of the N number of processors, and determine an operating state of each of the N number of processors based on a result of the checking.

The task monitoring circuitry can determine the operating state based on an instruction level for the corresponding processor as one of: high when a number of instructions allocated to the corresponding processor is the first threshold or greater, medium when the number of the instructions allocated to the corresponding processor is a second threshold or greater and less than the first threshold, and low when the number of the instructions allocated to the corresponding processor is less than the second threshold.

The second processor can correspond to a subsequent stage to a stage corresponding to the first processor among the N number of stages. The task monitoring circuitry can be configured to reallocate the at least one of second instructions, which have been allocated to the second processor, to the first processor when the instruction level of the first processor is low.

The task monitoring circuitry can be configured to preferentially select a second instruction among the second instructions allocated to the second processor, when the selected second instruction has the dependency to one of the first instructions enqueued in a first queue corresponding to the first processor among the N number of queues but no instructions has the dependency to the selected second instruction.

The selected second instruction is an earliest second instruction to be carried out among the second instructions.

The task monitoring circuitry can be further configured to, after reallocating the at least one of second instructions, reallocate a third instruction from a third processor to the second processor, the third instruction having the dependency to the at least one of second instructions.

The controller can allocate the plural instructions by: determining, based on maximum numbers of instructions that can be carried out by the respective multiple processors, each size of queues each configured to enqueue therein one or more instructions allocated to a corresponding processor of the pipelined multiple processors; and allocating the plural instructions to the pipelined multiple processors based on the determined size.

The first processor can have a higher stage than the second processor. The controller can be configured to, for the reallocating, preferentially select the at least one of second instructions, a number of which is less than a difference between the first threshold and a second threshold lower than the first threshold.

The command can include at least one command of a read command, a write command, and an erase command.

In another embodiment, a method for operating a data storage system can include receiving a command input from a host; generating plural instructions having dependency according to the command; allocating the plural instructions to the pipelined multiple processors in stages; reallocating, when a number of second instructions allocated to a second processor of the multiple processors becomes a first threshold or greater, at least one of the second instructions to a first processor of the multiple processors; and carrying out the plural instructions through the pipelined multiple processors.

The pipelined multiple processors can include N number of processors, where N is equal to or greater than 2. The carrying out the plural instructions can include carrying out, through each of the processors, one or more instructions that are allocated to the processor among the plural instructions according to N number of stages having the dependency.

The reallocating the at least one instruction can include checking N number of queues each configured to enqueue therein one or more instructions allocated to a corresponding processor of the N number of processors; and determining an operating state of each of the N number of processors based on a result of the checking.

The determining the operating states can include determining an instruction level of the corresponding processor as one of: high when a number of instructions allocated to the corresponding processor is the first threshold or greater, medium when the number of the instructions allocated to the corresponding processor is a second threshold or greater and less than the first threshold, and low when the number of the instructions allocated to the corresponding processor is less than the second threshold.

The second processor can correspond to a subsequent stage to a stage corresponding to the first processor among the N number of stages. The at least one of second instructions, which have been allocated to the second processor, is reallocated to the first processor when the instruction level of the first processor is low, until the instruction level of the first processor becomes medium after the reallocating.

The at least one of second instructions can be preferentially selected among the second instructions allocated to the second processor, when the selected second instruction has the dependency to one of the first instructions enqueued in a first queue corresponding to the first processor among the N number of queues but no instructions have the dependency to the selected second instruction.

The selected second instruction is an earliest second instruction to be carried out among the second instructions.

The method can further include reallocating a third instruction dependent on the second instruction to the second processor after the second instruction is reallocated to the first processor.

The allocating the at least one of the second instructions can include: determining, based on maximum numbers of instructions that can be carried out by the respective multiple processors, each size of queues each configured to enqueue therein one or more instructions allocated to a corresponding processor of the multiple processors; and allocating the plural instructions to the multiple processors based on the determined size.

Embodiments will now be described with reference to the accompanying drawings, wherein like numbers reference like elements.

FIG. 1 illustrates a data storage system according to an embodiment of the present disclosure. The data storage system may include a physical device configured to store data. According to an embodiment, the data storage system may be included in at least one computing device. In another embodiment, the data storage system may be coupled to at least one computing device through a wired or wireless network to perform data communication including a data input and output operation. An example of the data storage system is a memory system. The memory system may include a memory device capable of temporarily or permanently storing data.

Referring to FIG. 1, a memory system 110 may be coupled to a host 102, which is an external device. The memory system 110 may include a host interface layer (HIL) 220 and a flash translation layer (FTL) 240. An internal configuration of the memory system 110 may vary depending on characteristics of the memory device for storing data or data input/output performance which may be required. Examples of the internal configuration of the memory system 110 will be described later with reference to FIGS. 6 and 7.

The host 102 may transmit a command 990 to the memory system 110. Transmission of the command 990 may be performed based on a protocol predetermined for data communication between the host 102 and the memory system 110. An example of the protocol is Peripheral Component Interconnect Express (PCIe). Herein, the PCIe uses a slot or a specific cable to couple the host 102, such as a computing device, and the memory system 110, such as a peripheral device connected to the computing device. The PCIe can support a bandwidth of hundreds of MB per second or more per wire via a plurality of pins (e.g., 18 pins, 32 pins, 49 pins, 82 pins, etc.) and at least one wire (e.g., ×1, ×4, ×8, ×16, etc.). Through these features, the PCIe can implement bandwidths of tens to hundreds of Gbits per second.

After receiving the command 990, the memory system 110 may generate a plurality of instructions $992\_1$ to $992\_n$ corresponding to the command 990. The memory system 110 can perform various detailed operations in response to the command 990. When results of various detailed operations are derived, the memory system 110 can output a response corresponding to the command 990 to the host 102. For example, the command 990 transmitted from the host 102 to the memory system 110 is a read command. Receiving the read command, the memory system 110 can perform a read operation corresponding to the read command. The read operation may include a plurality of sub-operations. Examples of the plurality of sub-operations include an operation to verify and confirm the read command input from the host 102, an operation to check whether the read command can be performed, and an operation to verify and confirm an address (e.g., a logical address) input along with the read command from the host 102, an operation to convert the input address into an address (e.g., a physical address) used in the memory device, etc. Accordingly, the memory system 110 may generate the plurality of instructions $992\_1$ to $992\_n$ corresponding to each sub-operation to be performed in the memory system 110.

According to an embodiment, the memory system 110 may include a controller with a layered structure. The plurality of instructions $992\_1$ to $992\_n$ could be generated in each layer, or the plurality of instructions $992\_1$ to $992\_n$ could be assigned to each layer. For convenience of description, FIG. 1 illustrates the host interface layer (HIL) 220 as an example.

The memory system 110 may include a plurality of processors (Processor 1, Processor 2, Processor 3, . . . , Processor n). The host interface layer (HIL) 220 can perform operations corresponding to the plurality of instructions $992\_1\sim992\_n$ through the plurality of processors (Processor 1, Processor 2, Processor 3, . . . , Processor n). The number of the plurality of processors (Processor 1, Processor 2, Processor 3, . . . , Processor n) and the number of the plurality of instructions 992_1 to 992_n may be different. Additionally, the number of the plurality of instructions 992_1 to 992_n may vary depending on the command 990 input from the external device. The number of the plurality of instructions 992_1 to 992_n might not be a multiple of the number of the plurality of processors (Processor 1, Processor 2, Processor 3, . . . , Processor n). For example, 200 instructions can be allocated to a first processor (Processor 1), while 250 instructions can be allocated to a second processor (Processor 2).

The plurality of processors (Processor 1, Processor 2, Processor 3, . . . , Processor n) included in the memory system 110 may have a pipelined structure. The plurality of processors in a pipeline structure could be technically different from multiple processors in a parallel structure. The plurality of processors in the parallel structure may allow multiple cores or processors to execute different tasks simultaneously, so that plural operations corresponding to plural instructions can be performed in parallel. Each core or processor can run its own threads independently and in parallel with other cores or processors, increasing an overall throughput of a system including the plurality of processors in the parallel structure. The plurality of processors in the parallel structure can be typically used for various tasks that could be parallelized, such as video encoding, scientific simulations, and data processing. In contrast, the plurality of processors in the pipelined architecture can execute tasks in a pipeline where each core or processor performs a different stage or operation of the task, similar to an assembly line. Each core or processor may perform a specific task and then pass results to the next core included in the pipeline. The plurality of processors in the pipeline structure could be used to perform a series of tasks that should be performed in a specific order or sequence, such as video decoding or network packet processing.

The plurality of instructions 992_1 to 992_n generated in the memory system 110 in response to the command 990 input from the external device can have dependencies. Dependency may indicate that all or a part of the plurality of instructions 992_1 to 992_n should be executed in a specific order or sequence. The memory system 110 may use layered processes or threads to effectively use multiple cores or processors included in the pipeline. The layered processes or threads for pipelined multiple cores or multiple processors can be considered a technology used to optimize performance of pipelined multiple cores or processors by decomposing complex tasks into multiple layers or stages. Each layer or stage can be executed by a separate thread or process. In this approach, each layer or stage of task or work can be executed by a separate thread or process, and each thread or process runs on a different core or processor included in the multiple cores or processors. Each thread or process may be responsible for a specific set of tasks and pass its result to the next thread or process in the pipeline. By breaking down a work or task into plural layers or stages, each layer or stage could be optimized for a specific task it performs and run in parallel on different cores or processors. Through this, multiple cores or processors with a pipeline structure can perform tasks more efficiently by having each core process a specific layer or stage of the task, thereby improving a throughput and reducing a waiting time.

Referring to FIG. 1, the plurality of instructions 992_1 to 992_n generated in response to the command 990 may be allocated to the plurality of processors (Processor 1, Processor 2, Processor 3, . . . , Processor n). The plurality of instructions 992_1 to 992_n allocated to each stage or layer may have dependencies. Accordingly, when a result of executing an instruction in a first processor (Processor 1) can be delivered into a second processor (Processor 2), another instruction allocated to the second processor (Processor 2) could be executed based on the result. After the plurality of instructions 992_1 to 992_n are allocated to the plurality of processors (Processor 1, Processor 2, Processor 3, . . . , Processor n), the plurality of processors can perform a substantially equal number or equal load of work or task. In this case, data input/output performance of the memory system 110 could be improved. However, if a bottleneck occurs in a specific processor, the data input/output performance of the memory system 110 would be deteriorated. To avoid deterioration, the memory system 110 which includes the plurality of processors (Processor 1, Processor 2, Processor 3, . . . , Processor n) can monitor queues assigned to the plurality of processors (Processor 1, Processor 2, Processor 3, . . . , Processor n), or perform instruction offloading between the plurality of processors (Processor 1, Processor 2, Processor 3, . . . , Processor n).

Queue monitoring and instruction offloading may be used to improve operating performance in the memory system 110 including multiple cores or processors. The queue monitoring can include tracking queues of processes waiting to be executed in each processor in the memory system 110. By monitoring the queues, the memory system 110 could try to balance workloads across processors and ensure that processes that need to run do not hold or use too many processors. Through this, a bottleneck in the memory system 110 could be avoided and all processes could be controlled to run efficiently on the multiple cores or processors.

Instruction offloading is a technology that transfers a specific instruction to another processor for execution. The instruction offloading could be done when the processor is very busy executing other instructions and could not execute a new instruction immediately. An instruction can be transmitted (e.g., reallocated) to another processor which is capable of executing the instruction, thereby reducing a total processing time of the plurality of instructions 992_1 to 992_n and improving the operating performance of the memory system 110.

The memory system 110 may include the plurality of processors (Processor 1, Processor 2, Processor 3, . . . , Processor n) with a pipelined structure. For instruction offloading in the pipelined multiple cores or processors, a technique called pipeline interlocking or pipeline stalling could be used.

The pipeline interlocking may involve inserting a stall in the pipeline when a dependency between two instructions is detected. For example, if an instruction A depends on results of an instruction B but the instruction B is still executing in an early stage of the pipeline, a stop may be inserted to prevent the instruction A from proceeding until the results of the instruction B are available. The pipeline interlocking may allow instructions to be transferred to another processor for execution if the original processor cannot execute the instructions due to dependency stalls. Through these techniques, an overall processing time of the plurality of instructions 992_1 to 992_n could be reduced and the operating performance of the memory system 110 could be improved.

The memory system 110 can reduce or prevent performance degradation occurred due to collisions by avoiding several risks through pipeline interlocking. Regarding data hazard, if an instruction requires data that is not yet available, a pipeline interlock could be used to stop the pipeline until the data becomes available. For example, if an instruc-
tion A requires results of an instruction B, which is still
executing in an early stage of the pipeline, a stall is inserted
to prevent the instruction A from proceeding until the results
of instruction B are available. As an example of a control
hazard, while the pipeline is waiting for a decision, a
pipeline interlock can be used to delay the pipeline until the
decision is made. If an instruction requires a branch decision
but the branch decision cannot be made until later in the
pipeline, a stall could be inserted to prevent the instruction
from proceeding until the branch decision is made. As an
example of structural hazard, if two instructions require a
same hardware resources, a pipeline interlock could be used
to stop the pipeline until the same hardware resources
become available. For example, if two instructions should
use a same execution unit, a stall may be inserted to prevent
one instruction from continuing until the same execution
unit becomes available.

Another technique that can be used for instruction off-
loading in pipelined multiple cores or processors is dynamic
partitioning. In this technique, the processor divides instruc-
tions into two categories: critical instructions and non-
critical instructions. The critical instructions are executed on
a processor, while non-critical instructions may be moved to
another processor for execution. The dynamic partitioning
may reduce workload and improve the overall performance
of memory system 110 by allowing the most important
instructions to be executed on processors placed in a priority
stage while less important instructions are executed on other
processors placed in subsequent stages.

To schedule the plurality of instructions 992_1 to 992_n
with dependencies in the memory system 110 including the
pipelined multiple cores or processors, several things need
to be considered. First, the memory system 110 identifies
dependencies between the plurality of instructions 992_1 to
992_n. To ensure effective execution in the pipeline, it
should be determined which instructions need to be executed
before starting other instructions. Additionally, the memory
system 110 can divide the pipeline into plural stages. The
pipeline can be divided into the plural stages so that at least
some of the plurality of instructions 992_1 to 992_n could
be executed in parallel. Each stage could be assigned for a
different set of dependencies so that threads within each
stage can be executed in parallel. Afterwards, the memory
system 110 may allocate the plurality of instructions 992_1
to 992_n to each stage. Each instruction can be allocated to
each stage based on its dependency. For example, an instruc-
tion with no dependency to any other instruction could be
assigned to a first stage, but other instructions with depen-
dencies can be assigned to a later stage. For scheduling with
plural stages, the memory system 110 may allocate the
plurality of instructions 992_1 to 992_n to each stage and
then allow the plurality of instructions 992_1 to 992_n
within each stage to be executed in parallel. Further, the
memory system 110 could also check whether the instruc-
tions within stages are scheduled in a correct order accord-
ing to their dependencies. Additionally, through monitoring
and adjustment of the pipeline, the memory system 110 can
check whether the plurality of instructions 992_1 to 992_n
is executed effectively and whether there are no bottlenecks.
If necessary, the memory system 110 could adjust or change
instruction allocation in the pipeline to improve overall
performance.

To determine which stage of the pipeline the plurality of
instructions 992_1 to 992_n belong to or is allocated to, the
memory system 110 can determine or identify a set of
instructions associated with a specific instruction allocated in a specific stage while the plurality of instructions 992_1
to 992_n is performed within the overall work of the layered
processes. The memory system 110 can use a layered
approach to divide complex tasks into multiple layers or
stages, with each layer or stage being executed by a separate
thread or process, with each thread or process responsible
for a specific set of tasks within the complex tasks. The
memory system 110 may also check or reference dependen-
cies between different layers or stages of the tasks, because
each layer or stage may be required to receive input from a
previous layer or stage and pass output to the next layer or
stage.

Figure 2:
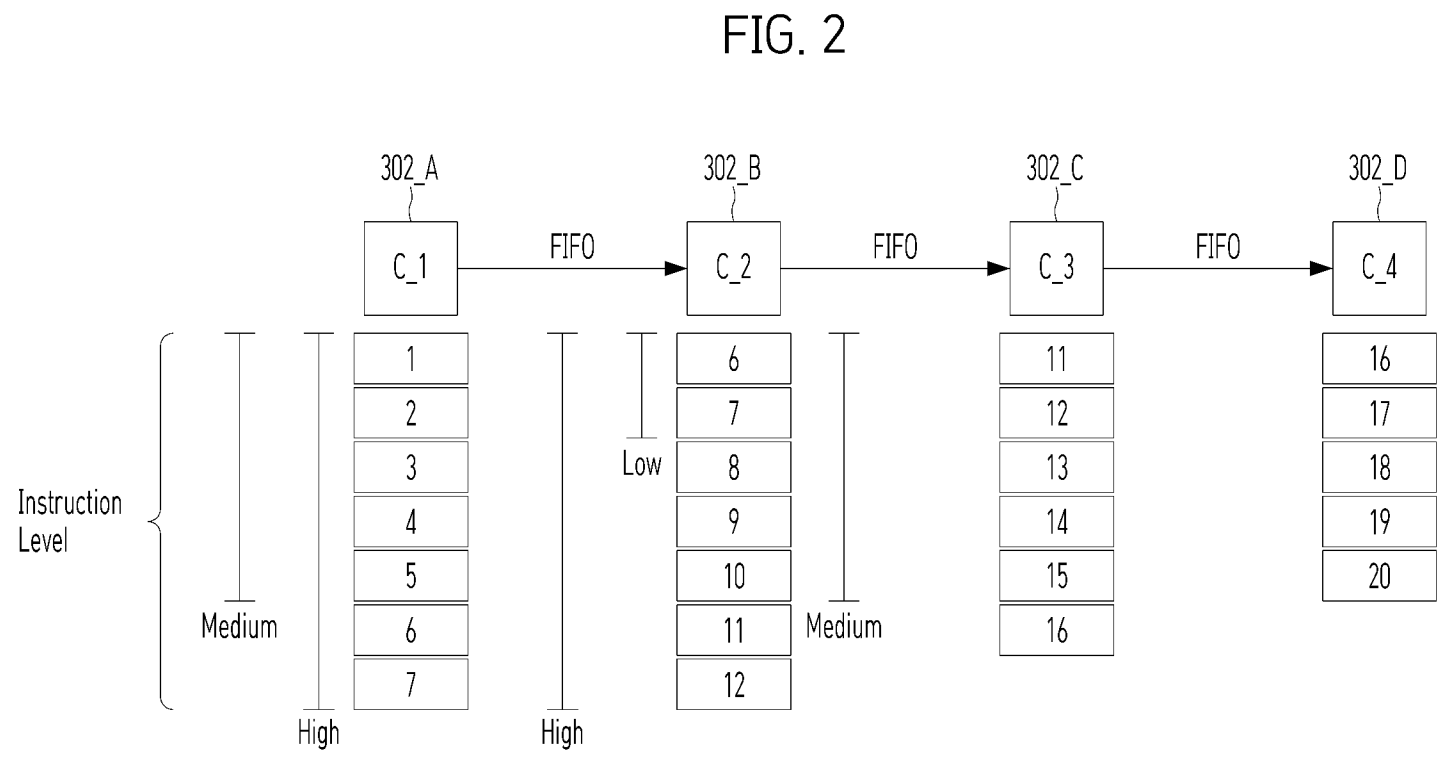

FIG. 2 illustrates allocation of instructions to multiple
processors having a pipelined structure according to an
embodiment of the present disclosure.

Referring to FIG. 2, the pipelined multiple processors can
include a first processor 302_A, a second processor 302_B,
a third processor 302_C, and a fourth processor 302_D.
Twenty instructions 1 to 20 could be sequentially allocated
to the first to fourth processors 302_A, 302_B, 302_C,
302_D. The number of instructions allocated to each of the
first processor 302_A, the second processor 302_B, the third
processor 302_C, and the fourth processor 302_D may be
different.

The number of instructions allocated to each of the first
processor 302_A, the second processor 302_B, the third
processor 302_C, and the fourth processor 302_D can be
referred to as an instruction level. According to an embodi-
ment, the instruction level can be broadly classified into
high, medium, and low. For example, if the number of
instructions assigned to a specific processor is equal to or
greater than a first threshold, the instruction level of the
corresponding processor could be determined to be high. If
the number of instructions assigned to a specific processor is
less than the first threshold and is equal to or greater than a
second threshold, the instruction level of the corresponding
processor could be determined to be Medium. If the number
of instructions assigned to a specific processor is less than
the second threshold, the instruction level of the correspond-
ing processor could be determined to be low. In FIG. 2,
instruction levels of the first processor 302_A and the second
processor 302_B, to which seven instructions are allocated,
are high, while instruction levels of the third processor
302_C and the fourth processor 302_D is medium.

According to an embodiment, the memory system 110
may reallocate the instructions to achieve that the instruction
levels of the first processor 302_A, the second processor
302_B, the third processor 302_C, and the fourth processor
302_D belong to medium. For example, if the instruction
level of a specific processor is low, the instruction which has
been assigned to another processor could be moved to an
alternate processor to adjust the instruction level of the
alternate processor to medium. Conversely, if the instruction
level of a specific processor is high, the instruction allocated
to that processor can be moved to another processor to adjust
the instruction level of that processor to medium. Through
these reallocations, the memory system 110 can maintain
that the instruction levels of the first processor 302_A, the
second processor 302_B, the third processor 302_C, and the
fourth processor 302_D are substantially equal or belong to
a same range or classification. The memory system 110
could avoid or prevent excessive loads on a specific pro-
cessor and maintain a workload balance between processors.

Figure 3:
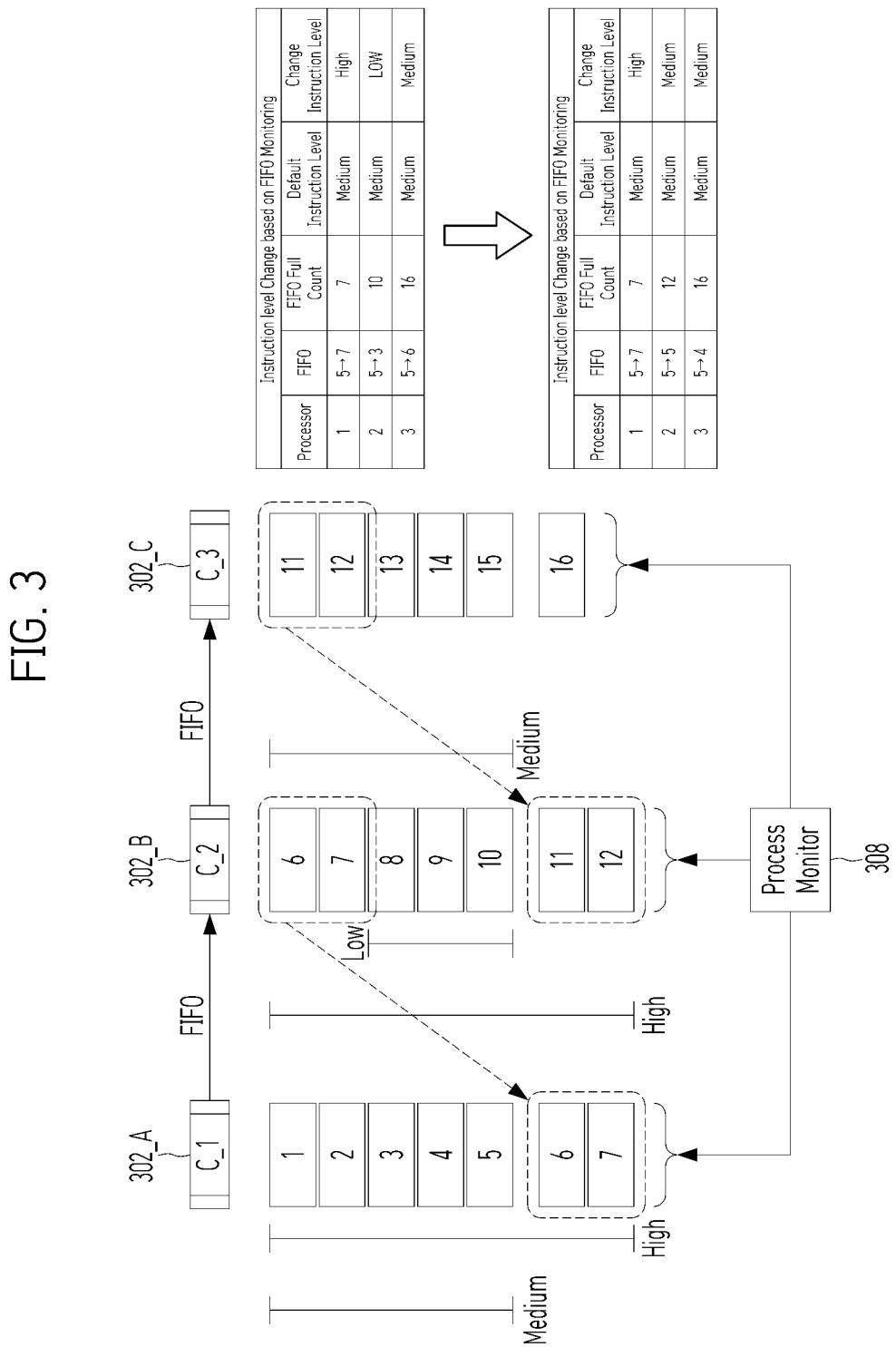
FIG. 3 illustrates reallocation of instructions according to an embodiment of the present disclosure.

FIG. 3 illustrates reallocation of instructions according to
an embodiment of the present disclosure.

Referring to FIG. 3, the pipelined multiple processors
may include a first processor 302_A, a second processor 302_B, and a third processor 302_C. Initially, each 5 instructions (i.e., 15 instructions (1 to 15)) among the plurality of instructions (1 to 16) may be allocated to each of the first processor 302_A, the second processor 302_B, and the third processor 302_C.

The memory system 110 can include a task monitoring circuitry 308 configured to check and monitor instructions allocated to each of the first processor 302_A, the second processor 302_B, and the third processor 302_C. The task monitoring circuitry 308 can be engaged operatively with each of the first processor 302_A, the second processor 302_B, and the third processor 302_C. According to an embodiment, the task monitoring circuitry 308 can check or monitor queues assigned to each of the first processor 302_A, the second processor 302_B, and the third processors 302_C. Instructions stored in the queues may be performed by each of the first processor 302_A, the second processor 302_B, and the third processor 302_C based on a policy of First In, First Out (FIFO).

Due to dependencies between the 15 instructions (1 to 15) allocated to the first processor 302_A, the second processor 302_B, and the third processor 302_C, the first processor 302_A can sequentially perform operations corresponding to five instructions (1 to 5). However, the second processor 302_B and the third processor 302_C could not perform the allocated instructions due to the dependencies. At this time, the task monitoring unit 308 may reallocate two sixth and seventh instructions 6, 7 which have been allocated to the second processor 302_B to the first processor 302_A. As a result of the reallocation, the number of instructions allocated to the first processor 302_A may increase from 5 to 7, and the number of instructions allocated to the second processor 302_B may decrease from 5 to 3. Additionally, the 16th instruction 16 may be allocated to the third processor 302_C.

When the number of instructions assigned to the second processor 302_B is reduced from 5 to 3 and the instruction level of the second processor 302_B becomes low, the task monitoring circuitry 308 may reallocate some of the instructions which have been allocated to the third processor 302_C corresponding to the next stage to the second processor 302_B. If the 11th and 12th instructions 11, 12 are reallocated from the third processor 302_C to the second processor 302_B, the number of instructions assigned to the second processor 302_B may increase from 3 to 5, and the number of instructions allocated to the third processor 303_C may be reduced from 6 to 4.

Through two instruction reallocations, the instruction level of the first processor 303_A becomes high, but the instruction levels of the second processor 302_B and the third processor 302_C could be medium. Although the instruction level of the first processor 303_A is increased, the task monitoring circuitry 308 may balance workloads of the first processor 302_A, the second processor 302_B, and the third processor 302_C based on the dependencies.

According to an embodiment, the memory system 110 may generate a plurality of instructions and then determine sizes of the queues corresponding to the maximum number of instructions that each of the multiple cores or processors can perform. Additionally, the task monitoring circuitry 308 may adjust the number of instructions performed by each of the multiple cores or processors to be less than or equal to the maximum number of instructions. For example, if the instruction level of the first processor 303_A is set to the maximum of 10, the size of the queue assigned to the first processor 303_A may be determined to store 10 instructions. Accordingly, the task monitoring circuitry 308 may control that the number of instructions allocated to the first processor 303_A does not exceed 10, i.e., the maximum number of instructions.

Figure 4:
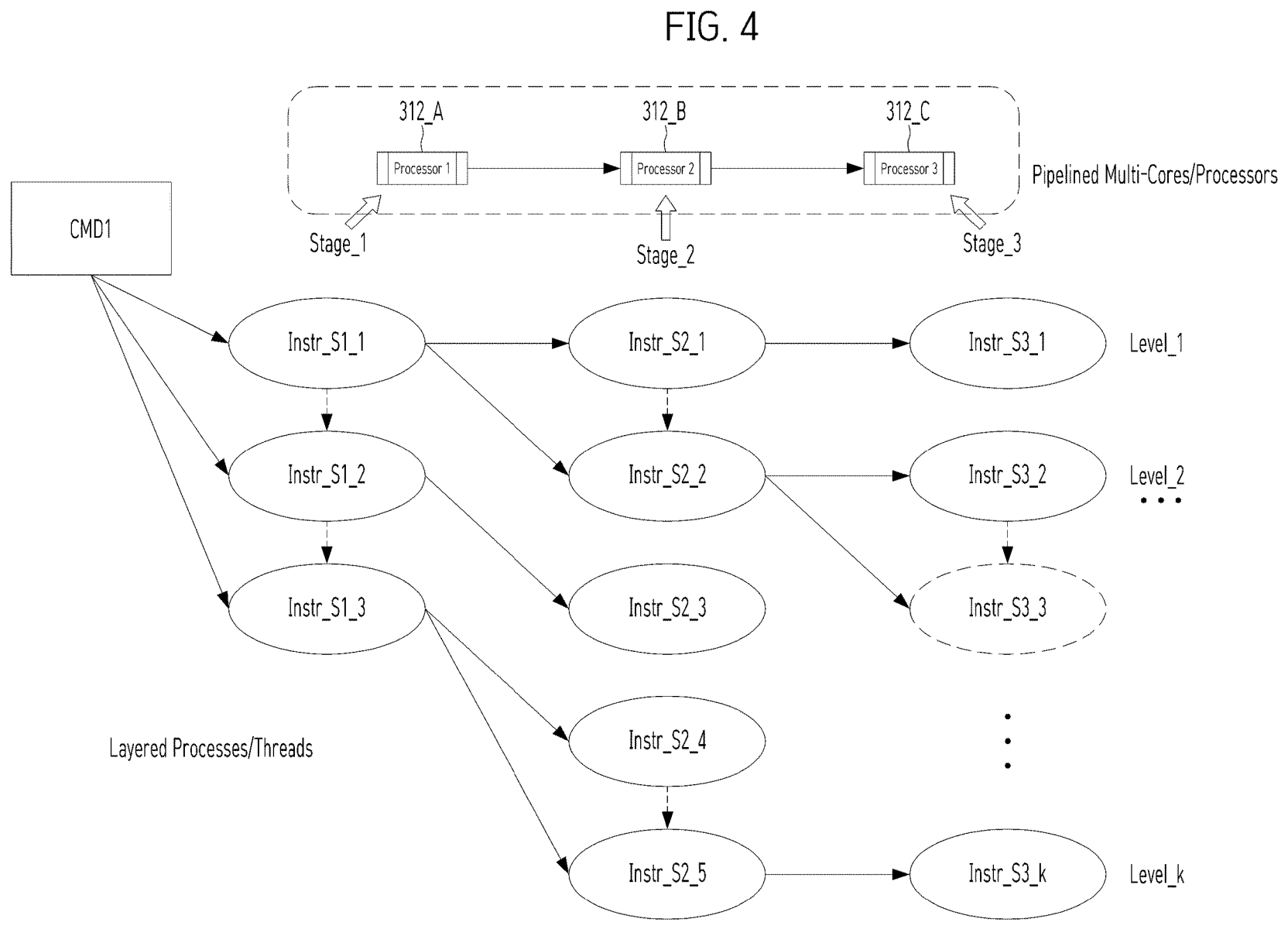

FIG. 4 illustrates allocation of instructions according to another embodiment of the present disclosure.

Referring to FIG. 4, the pipelined multiple cores or processors may include a first processor 312_A, a second processor 312_B, and a third processor 312_C. The first processor 312_A, the second processor 312_B, and the third processor 312_C may execute instructions allocated corresponding to each stage Stage_1, Stage_2, Stage_3.

The memory system 110 may generate a plurality of instructions Instr_S1_1 to Instr_S3_k in response to a command CMD1 externally input or internally generated. The dependencies between the command CMD1 and the plurality of instructions Instr_S1_1 to Instr_S3_k may be indicated by arrows shown in FIG. 4. For example, three instructions Instr_S1_1, Instr_S1_2, Instr_S1_3 allocated to a first stage Stage_1 may have dependencies on the command CMD1. Further, two other instructions Instr_S2_1, Instr_S2_2 allocated to a second stage Stage_2 may have dependencies on the first instruction Instr_S1_1. Additionally, another instruction Instr_S3_1 belonging to a third stage Stage_3 may have a dependency on a fourth instruction Instr_S1_1.

According to an embodiment, the three instructions Instr_S1_1, Instr_S1_2, Instr_S1_3 belonging to the first stage Stage_1 may sequentially have dependencies (dotted arrows shown in FIG. 3).

The plurality of instructions Instr_S1_1 to Instr_S3_k generated for the operation corresponding to the command (CMD1) can be divided into, and allocated to, three stages. The instruction level of the first processor 312_A corresponding to the first stage Stage_1 is 3, and the instruction level of the second processor 312_B corresponding to the second stage Stage_2 is 5. The instruction level of the third processor 312_C corresponding to the third stage Stage_3 is k.

Referring to FIG. 4, the memory system 110 can allocate the plurality of instructions Instr_S1_1 to Instr_S3_k having irregular dependencies to three stages corresponding to the first processor 312_A, the second processor 312_B, and the third processor 312_C included in the pipelined multiple cores or processors. Here, the number of processors or the number of stages included in the pipelined multiple cores or processors may vary based on configuration of resources included in the memory system 110. Additionally, the dependencies and number of the plurality of instructions Instr_S1_1 to Instr_S3_k may vary depending on the command CMD1.

Figure 5:
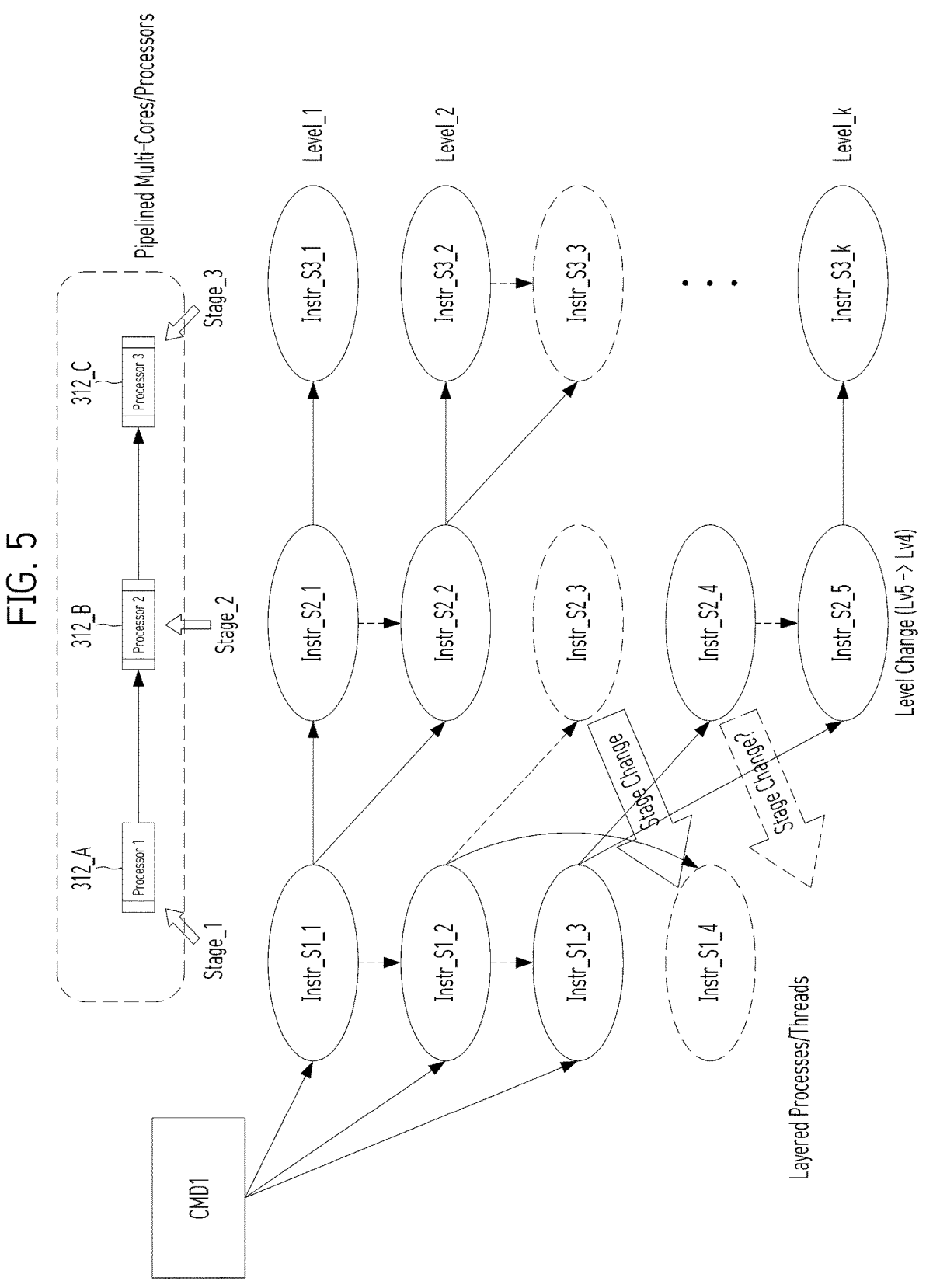
FIG. 5 illustrates reallocation of instructions according to another embodiment of the present disclosure.

FIG. 5 illustrates reallocation of instructions according to another embodiment of the present disclosure. Specifically, FIG. 5 describes reallocation for some of the plurality of instructions Instr_S1_1 to Instr_S3_k described in FIG. 4.

First, referring to FIG. 4, the instruction level of the first processor 312_A corresponding to the first stage Stage_1 is less than the instruction level of the second processor 312_B corresponding to the second stage Stage_2. However, the fourth to eighth instructions Instr_S2_1 to Instr_S2_5 allocated to the second stage Stage_2 have dependencies on the first to third instructions Instr_S1_1 to Instr_S1_3 allocated to the first stage Stage_1. Therefore, if the first to third instructions Instr_S1_1 to Instr_S1_3 are not completely executed by the first processor 312_A, the second processor 312_B could not perform the fourth to eighth instructions Instr_S2_1 to Instr_S2_5 because of dependencies. Therefore, while the first processor 312_A operates, the second processor 312_B does not operate, which may result in inefficiency.

To improve inefficiencies occurring based on dependency, the task monitoring circuitry 308 described in FIG. 3 can perform a stage change for a sixth instruction Instr_S2_3 which has been allocated to the second stage. The sixth instruction Instr_S2_3 could be reallocated as a sixth reallocated instruction Instr_S1_4 to the first processor 312_A corresponding to the first stage Stage_1. The instruction level of the first processor 312_A corresponding to the first stage Stage_1 can increase from 3 to 4 (Lv3→Lv4). The instruction level of the second processor 312_B corresponding to the second stage Stage_2 can decrease from 5 to 4 (Lv5→Lv4). Through this stage change, the instruction level of the first processor 312_A corresponding to the first stage Stage_1 and the instruction level of the second processor 312_B corresponding to the second stage Stage_2 could be equalized.

The instructions stored in the queue of the first processor 312_A corresponding to the first stage Stage_1 may be performed in a FIFO policy. Therefore, even if the sixth instruction Instr_S2_3 is changed with the sixth reallocated instruction Instr_S1_4 allocated to the first stage, issues due to dependency might not occur. Here, the issues due to dependency may include a bottleneck such as a phenomenon in which a specific processor among a plurality of processors in a pipeline structure fails to perform instructions stored in the queue due to dependency and remains for a long time in a waiting or standby state even after the instruction is allocated to each stage.

According to an embodiment, a method for selecting at least one instruction subject to the stage change, such as the sixth instruction Instr_S2_3, by the task monitoring circuitry 308 may be different.

According to an embodiment, the task monitoring circuitry 308 can reallocate the sixth instruction Instr_S2_3 waiting in the second processor 312_B, which has a dependency on the second instruction Instr_S1_2 waiting in the first processor (312_A), to the first processor 312_A. In addition, the task monitoring circuitry 308 can reallocate a seventh instruction Instr_S2_4 or an eighth instruction Instr_S2_5 waiting in the second processor 312_B, which has a dependency on the third instruction Instr_S1_3 waiting in the first processor 312_A, to the first processor 312_A. When a stage change is made in which the seventh instruction Instr_S2_4 is reallocated to the first processor 312_A, an issue due to dependency might not occur even if the eighth instruction Instr_S2_5 is not reallocated to the first processor 312_A. In addition, after the stage change is made in which the seventh instruction Instr_S2_4 is reallocated to the first processor 312_A, the last instruction Instr_S3_k which has a dependency on the eighth instruction Instr_S2_5 could be reallocated from the third stage Stage_3 to the second stage Stage_2. In this stage change, an issue due to dependency might not occur.

According to an embodiment, sequential stage changes of the seventh instruction Instr_S2_4 and the last instruction Instr_S3_k may be possible. The stage change of the seventh instruction Instr_S2_4 may be determined based on differences in instruction levels of the first processor 312_A, the second processor 312_B, and the third processor 312_C. Thus, the task monitoring circuitry 308 could perform instruction reallocation or instruction offloading in a way that reduces the differences in instruction levels between the first processor 312_A, the second processor 312_B, and the third processor 312_C.

The first instruction Instr_S1_1 stored in the queue of the first processor 312_A corresponding to the first stage Stage_1 is in a state that can be performed first according to the FIFO policy. The fourth instruction Instr_S2_1 and the fifth instruction Instr_S2_2 that have dependency on the first instruction Instr_S1_1 may be performed subsequently by the second processor 312_B corresponding to the second stage Stage_2 based on the result of the first instruction Instr_S1_1. In this case, when the task monitoring unit 308 changes the stages of the fourth instruction Instr_S2_1 and the fifth instruction Instr_S2_2, workloads of the second processor 312_B corresponding to the second stage Stage_2 could be greatly reduced. Accordingly, the task monitoring circuitry 308 might not consider changing the stages of the fourth instruction (Instr_S2_1) and the fifth instruction (Instr_S2_2) to balance workloads between processors or stages.

Further, there is no instruction allocated to the third stage Stage_3, which has dependency on the sixth instruction Instr_S2_3. According to an embodiment, the task monitoring circuitry 308 may preferentially perform a stage change for the sixth instruction Instr_S2_3. An instruction having no dependent instructions could be prioritized for reallocation. Provided that no instructions have dependency to a selected instruction, a stage change for the selected instruction would not increase complexity because there is no need to add a stall for pipeline interlocking or pipeline stalling.

According to an embodiment, for stage change, at least one instruction which has been allocated to the second stage Stage_2 or the third stage Stage_3, which is a stage subsequent to the first stage Stage_1, may be selected. At this time, the task monitoring circuitry 308 may preferentially consider the fourth instruction (Instr_S2_1), which has the earliest execution order among instructions waiting in the second processor 312_B corresponding to the second stage Stage_2. However, the fourth instruction Instr_S2_1 has dependent instructions (e.g., the fifth instruction Intra_S2_2 and the ninth instruction Instr_S3_1). Accordingly, the task monitoring circuitry 308 may check a stage change for an instruction among instructions waiting in the second processor 312_B corresponding to stage 2 Stage_2 in an execution order. However, selecting an instruction for the stage change could be preferentially achieved to reduce or avoid a complexity increase in scheduling. For example, the sixth instruction Instr_S2_3, which has no other dependent instructions, could be selected for the stage change preferentially.

According to an embodiment, when a specific instruction is reallocated, other instructions that are dependent on the instruction may also be reallocated. For example, when the fifth instruction Instr_S2_2 changes a stage from the second processor 312_B to the first processor 312_A, stages of the tenth instruction Instr_S3_2 and the eleventh instruction Instr_S3_3 that have dependency on the fifth instruction Instr_S2_2 could also be changed from the third stage Stage_3 corresponding to the third processor 312_C to the second stage Stage_2 corresponding to the second processor 312_B.

Further, referring to FIGS. 2 to 5, according to an embodiment, the task monitoring circuitry 308 can determine that the number of instructions belonging to a lower level that have dependencies on an instruction belonging to a higher level is greater than a difference between first and second thresholds. Instructions having a smaller number of dependencies could be reallocated first. Herein, the first threshold and the second threshold may be values used to determine an instruction level of each processor or core. Because the instruction level of the processor or core corresponding to each stage could be changed based on the number of instructions selected to change the stage, the task monitoring circuitry 308 can monitor the number of instructions belonging to, or allocated to, the subsequent stage(s) to gradually change the instruction level. Provided that the number of instructions belonging to a lower level that are dependent on instructions belonging to a higher level is less than the difference between the first and second thresholds, a rapid change in the instruction level of each stage could be avoided even if a stage change is made for the corresponding instruction.

Figure 6:
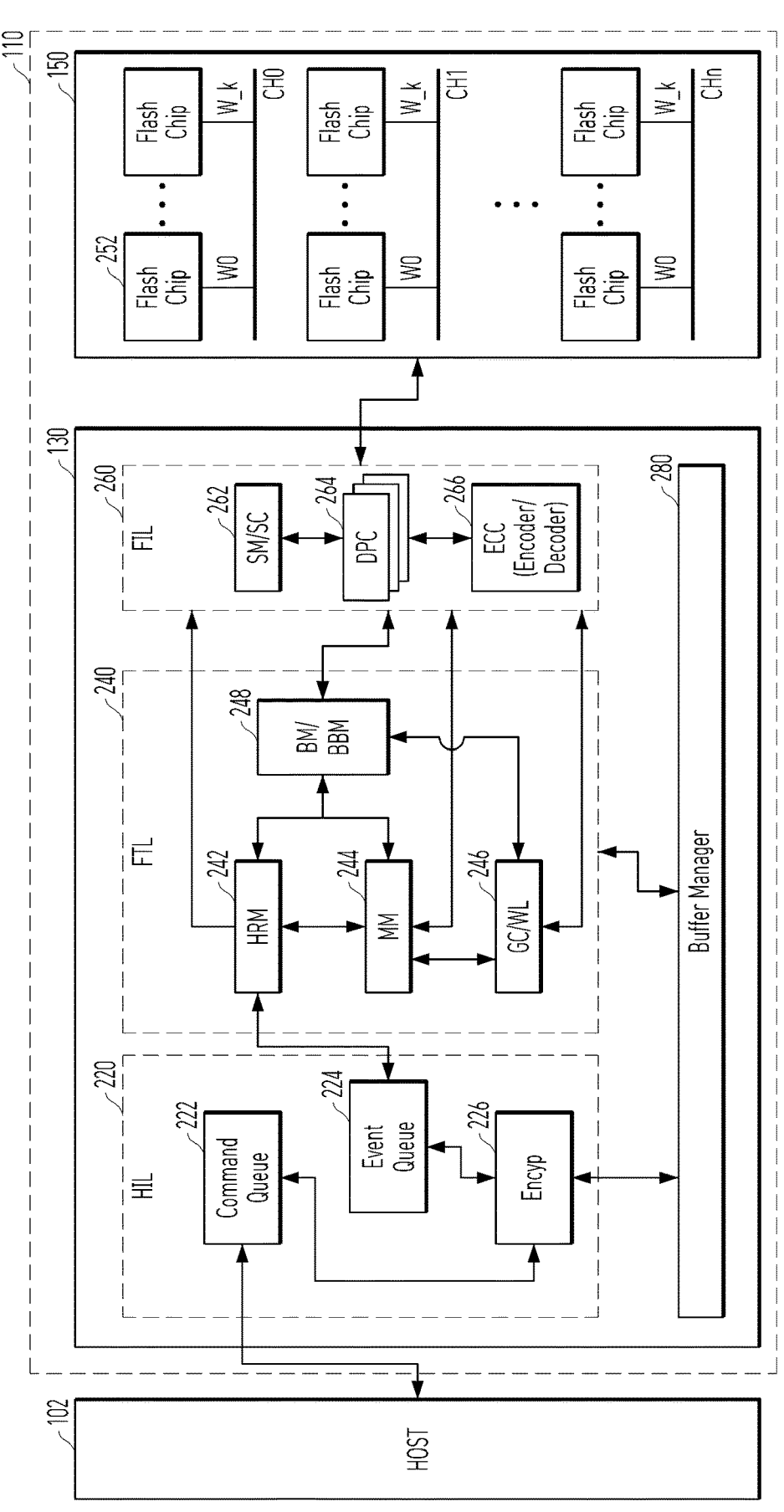
FIG. 6 illustrates a data processing system according to an embodiment of the present disclosure.

FIG. 6 illustrates a data processing system according to an embodiment of the present disclosure.

Referring to FIG. 6, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

The memory device 150 can include plural memory chips 252 coupled to the controller 130 through plural channels CH0, CH1, . . . , CHn and ways W0, . . . , W_k. The memory chip 252 can include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells. Each memory plane or each memory die can support an interleaving mode in which plural data input/output operations are performed in parallel or simultaneously. According to an embodiment, memory blocks included in each memory plane, or each memory die, included in the memory device 150 can be grouped to input/output plural data entries as a super memory block. An internal configuration of the memory device 150 shown in FIG. 6 may be changed based on operating performance of the memory system 110. An embodiment of the present disclosure may not be limited to the internal configuration described in FIG. 6.

According to an embodiment, the memory device 150 and the controller 130 may be components or elements functionally divided. Further, according to an embodiment, the memory device 150 and the controller 130 may be implemented with a single chip or a plurality of chips.

The controller 130 may perform a data input/output operation (such as a read operation, a program operation, an erase operation, etc.) in response to a request or a command input from an external device such as the host 102. For example, when the controller 130 performs a read operation in response to a read request input from an external device, data stored in a plurality of non-volatile memory cells included in the memory device 150 is transferred to the controller 130. Further, the controller 130 can independently perform an operation regardless of the request or the command input from the host 102. Regarding an operation state of the memory device 150, the controller 130 can perform an operation such as garbage collection (GC), wear leveling (WL), a bad block management (BBM) for checking whether a memory block is bad and handling a bad block.

Each memory chip 252 can include a plurality of memory blocks. The memory blocks may be understood as a group of non-volatile memory cells in which data is removed together by a single erase operation. Although not illustrated, the memory block may include a page which is a group of non-volatile memory cells that store data together during a single program operation or output data together during a single read operation. For example, one memory block may include a plurality of pages. The memory device 150 may include a voltage supply circuit capable of supplying at least one voltage into the memory block. The voltage supply circuit may supply a read voltage Vrd, a program voltage Vprog, a pass voltage Vpass, or an erase voltage Vers into a non-volatile memory cell included in the memory block.

The host 102 interworking with the memory system 110, or the data processing system 110 including the memory system 110 and the host 102, is a mobility electronic device (such as a vehicle), an portable electronic device (such as a mobile phone, a smartwatch, an MP3 player, a laptop computer, or the like), and a non-portable electronic device (such as a desktop computer, a game machine, a TV, a projector, or the like). The host 102 may provide interaction between the host 102 and a user using the data processing system 100 or the memory system 110 through at least one operating system (OS). The host 102 transmits a plurality of commands corresponding to a user's request to the memory system 110, and the memory system 110 performs data input/output operations corresponding to the plurality of commands (e.g., operations corresponding to the user's request).

Referring to FIG. 6, the controller 130 in a memory system operates along with the host 102 and the memory device 150. As illustrated, the controller 130 may have a layered structure including the host interface (HIL) 220, a flash translation layer (FTL) 240, and the memory interface layer or flash interface layer (FIL) 260.

The host interface layer (HIL) 220, the flash translation layer (FTL) 240, and the memory interface layer or flash interface layer (FIL) 260 described in FIG. 6 are illustrated as one embodiment. The host interface layer (HIL) 220, the flash translation layer (FTL) 240, and the flash interface layer (FIL) 260 may be implemented in various forms according to the operating performance of the memory system 110. As described in FIG. 1, the host interface layer (HIL) 220, the flash translation layer (FTL) 240, and the flash interface layer (FIL) 260 can perform operations through multiple cores or processors in the pipelined structure included in the controller 130.

The host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host 102 and the memory system 110 may be coupled to each other through a Universal Serial Bus (USB). The Universal Serial Bus (USB) is a highly scalable, hot-pluggable, plug-and-play serial interface that ensures cost-effective, standard connectivity to peripheral devices such as keyboards, mice, joysticks, printers, scanners, storage devices, modems, video conferencing cameras, and the like.

A buffer manager 280 in the controller 130 can control the input/output of data or operation information in conjunction with the host interface layer (HIL) 220, the flash translation layer (FTL) 240, and the memory interface layer or flash interface layer (FIL) 260. To this end, the buffer manager 280 can set or establish various buffers, caches, or queues in a memory included in, or engaged with, the controller 130, and control data input/output of the buffers, the caches, or the queues, or data transmission between the buffers, the caches, or the queues in response to a request or a command generated by the host interface layer (HIL) 220, the flash translation layer (FTL) 240, and the memory interface layer or flash interface layer (FIL) 260.

For example, the controller 130 may temporarily store read data provided from the memory device 150 in response to a request from the host 102 before providing the read data to the host 102. Also, the controller 130 may temporarily store write data provided from the host 102 in a memory before storing the write data in the memory device 150. When controlling operations such as a read operation, a program operation, and an erase operation performed within the memory device 150, the read data or the write data transmitted or generated between the controller 130 and the memory device 150 in the memory system 110 could be stored and managed in a buffer, a queue, etc. established in the memory by the buffer manager 280. Besides the read data or the write data, the buffer manager 280 can store signal or information (e.g., map data, a read command, a program command, or etc. which is used for performing operations such as programming and reading data between the host 102 and the memory device 150) in the buffer, the cache, the queue, etc. established in the memory. The buffer manager 280 can set, or manage, a command queue, a program memory, a data memory, a write buffer/cache, a read buffer/cache, a data buffer/cache, a map buffer/cache, and etc.

The host interface layer (HIL) 220 may handle commands, data, and the like transmitted from the host 102. By way of example but not limitation, the host interface layer 220 may include a command queue manager 222 and an event queue manager 224. The command queue manager 222 may sequentially store the commands, the data, and the like received from the host 102 in a command queue, and output them to the event queue manager 224, for example, in an order in which they are stored in the command queue manager 222. The event queue manager 224 may sequentially transmit events for processing the commands, the data, and the like received from the command queue.

According to an embodiment, the event queue manager 224 may classify, manage, or adjust the commands, the data, and the like received from the command queue. Further, according to an embodiment, the host interface layer 220 can include an encryption manager 226 configured to encrypt a response or output data to be transmitted to the host 102 or to decrypt an encrypted portion in the command or data transmitted from the host 102.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or commands for reading data, i.e., a read command, and a command for programming/writing data, i.e., a write command, may be alternately transmitted to the memory system 110. The command queue manager 222 of the host interface layer 220 may sequentially store commands, data, and the like, which are transmitted from the host 102, in the command queue. Thereafter, the host interface layer 220 may estimate or predict what type of internal operations the controller 130 will perform according to the characteristics of the commands, the data, and the like, which have been transmitted from the host 102. The host interface layer 220 may determine a processing order and a priority of commands, data and the like based on their characteristics. According to the characteristics of the commands, the data, and the like transmitted from the host 102, the event queue manager 224 in the host interface layer 220 is configured to receive an event, which should be processed or handled internally within the memory system 110 or the controller 130 according to the commands, the data, and the like input from the host 102, from the buffer manager 280. Then, the event queue manager 224 can transfer the event including the commands, the data, and the like into the flash translation layer (FTL) 240.

According to an embodiment, the flash translation layer (FTL) 240 may include a host request manager (HRM) 242, a map manager (MM) 244, a state manager 246, and a block manager 248. Further, according to an embodiment, the flash translation layer (FTL) 240 may implement a multi-thread scheme to perform data input/output (I/O) operations. A multi-thread FTL may be implemented through a multiprocessor using multi-thread included in the controller 130. For example, the host request manager (HRM) 242 may manage the events transmitted from the event queue. The map manager (MM) 244 may handle or control map data. The state manager 246 may perform an operation such as garbage collection (GC) or wear leveling (WL), after checking an operation state of the memory device 150. The block manager 248 may execute commands or instructions onto a block in the memory device 150.

The host request manager (HRM) 242 may use the map manager (MM) 244 and the block manager 248 to handle or process requests according to read and program commands and events which are delivered from the host interface layer 220. The host request manager (HRM) 242 may send an inquiry request to the map manager (MM) 244 to determine a physical address corresponding to a logical address which is entered with the events. The host request manager (HRM) 242 may send a read request with the physical address to the memory interface layer 260 to process the read request, i.e., handle the events. In one embodiment, the host request manager (HRM) 242 may send a program request (or a write request) to the block manager 248 to program data to a specific empty page storing no data in the memory device 150, and then may transmit a map update request corresponding to the program request to the map manager (MM) 244 to update an item relevant to the programmed data in information of mapping the logical and physical addresses to each other.

The block manager 248 may convert a program request delivered from the host request manager (HRM) 242, the map manager (MM) 244, and/or the state manager 246 into a flash program request used for the memory device 150, to manage flash blocks in the memory device 150. To maximize or enhance program or write performance of the memory system 110, the block manager 248 may collect program requests and send flash program requests for multiple-plane and one-shot program operations to the memory interface layer 260. In an embodiment, the block manager 248 sends several flash program requests to the memory interface layer 260 to enhance or maximize parallel processing of a multichannel and multi-directional flash controller.

In an embodiment, the block manager 248 may manage blocks in the memory device 150 according to the number of valid pages, select and erase blocks having no valid pages when a free block is needed and select a block including the least number of valid pages when it is determined that garbage collection is to be performed. The state manager 246 may perform garbage collection to move valid data stored in the selected block to an empty block and erase data stored in the selected block so that the memory device 150 may have enough free blocks (i.e., empty blocks with no data).

When the block manager 248 provides information regarding a block to be erased to the state manager 246, the state manager 246 may check all flash pages of the block to be erased to determine whether each page of the block is valid. For example, to determine validity of each page, the state manager 246 may identify a logical address recorded in an out-of-band (OOB) area of each page. To determine whether each page is valid, the state manager 246 may compare a physical address of the page with a physical address mapped to a logical address obtained from an inquiry request. The state manager 246 sends a program request to the block manager 248 for each valid page. A map table may be updated by the map manager 244 when a program operation is complete.

The map manager 244 may manage map data, e.g., a logical-physical map table. The map manager 244 may process various requests, for example, queries, updates, and the like, which are generated by the host request manager (HRM) 242 or the state manager 246. The map manager 244 may store the entire map table in the memory device 150, e.g., a flash/non-volatile memory, and cache mapping entries according to the storage capacity of the memory 144. When a map cache miss occurs while processing inquiry or update requests, the map manager 244 may send a read request to the memory interface layer 260 to load a relevant map table stored in the memory device 150. When the number of dirty cache blocks in the map manager 244 exceeds a certain threshold value, a program request may be sent to the block manager 246, so that a clean cache block is made and a dirty map table may be stored in the memory device 150.

When garbage collection is performed, the state manager 246 copies valid page(s) into a free block, and the host request manager (HRM) 242 may program the latest version of the data for the same logical address of the page and concurrently issue an update request. When the state manager 246 requests the map update in a state in which the copying of the valid page(s) is not completed normally, the map manager 244 may not perform the map table update. This is because the map request is issued with old physical information when the state manger 246 requests a map update and a valid page copy is completed later. The map manager 244 may perform a map update operation to ensure accuracy when, or only if, the latest map table still points to the old physical address.

The memory interface layer or flash interface layer (FIL) 260 may exchange data, commands, state information, and the like, with a plurality of memory chips 252 in the memory device 150 through a data communication method. According to an embodiment, the memory interface layer 260 may include a status check schedule manager 262 and a data path manager 264. The status check schedule manager 262 can check and determine the operation state regarding the plurality of memory chips 252 coupled to the controller 130, the operation state regarding a plurality of channels CH0, CH1, . . . , CHn and the plurality of ways W0, . . . , W_k, and the like. The transmission and reception of data or commands can be scheduled in response to the operation states regarding the plurality of memory chips 252 and the plurality of channels CH0, CH1, . . . , CHn. The data path manager 264 can control the transmission and reception of data, commands, etc. through the plurality of channels CH0, CH1, . . . , CHn and ways W0, . . . , W_k based on the information transmitted from the status check schedule manager 262. According to an embodiment, the data path manager 264 may include a plurality of transceivers, each transceiver corresponding to each of the plurality of channels CH0, CH1, . . . , CHn. Further, according to an embodiment, the status check schedule manager 262 and the data path manager 264 included in the memory interface layer 260 could be implemented as, or engaged with, a memory control sequence generator.

According to an embodiment, the memory interface layer 260 may further include ECC (error correction code) circuitry 266 configured to perform error checking and correction of data transferred between the controller 130 and the memory device 150. The ECC unit 266 may be implemented as a separate module, circuit, or firmware in the controller 130, but may also be implemented in each memory chip 252 included in the memory device 150 according to an embodiment. The ECC circuitry 266 may include a program, a circuit, a module, a system, or an apparatus for detecting and correcting an error bit of data processed by the memory device 150.

For finding and correcting any error of data transferred from the memory device 150, the ECC circuitry 266 can include an error correction code (ECC) encoder and an ECC decoder. The ECC encoder may perform error correction encoding of data to be programmed in the memory device 150 to generate encoded data into which a parity bit is added and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the ECC circuitry 266 can determine whether the error correction decoding has succeeded or not, and outputs an instruction signal, e.g., a correction success signal or a correction fail signal, based on a result of the error correction decoding. The ECC circuitry 266 may use a parity bit, which has been generated during the ECC encoding process for the data stored in the memory device 150, to correct the error bits of the read data entries. When the number of the error bits is greater than or equal to the number of correctable error bits, the ECC circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above-described codes.

For example, the encoder in the ECC circuitry 266 may generate a codeword that is a unit of ECC-applied data. A codeword of length n bits may include k bits of user data and (n-k) bits of parity. A code rate may be calculated as (k/n). The higher the code rate, the more user data that can be stored in a given codeword. As the length of the codeword is longer and the code rate is smaller, the error correction capability of the ECC circuitry 266 could be improved. In addition, the ECC circuitry 266 performs decoding using information read from the channels CH0, CH1, . . . , CHn. The decoder in the ECC circuitry 266 can be classified into a hard decision decoder and a soft decision decoder according to how many bits represent the information to be decoded. A hard decision decoder performs decoding with a memory cell output information expressed in 1 bit, and the 1-bit information used at this time is called hard decision information. A soft decision decoder uses more accurate memory cell output information composed of 2 bits or more, and this information is called soft decision information. The ECC circuitry 266 may correct errors included in data using the hard decision information or the soft decision information.

According to an embodiment, to increase the error correction capability, the ECC circuitry 266 may use a concatenated code using two or more codes. In addition, the ECC circuitry 266 may use a product code that divides one codeword into several rows and columns and applies a different relatively short ECC to each row and column.

In accordance with an embodiment, a manager included in the host interface layer 220, the flash translation layer (FTL) 240, and the memory interface layer or flash interface layer (FIL) 260 could be implemented with a general processor, an accelerator, a dedicated processor, a co-processor, a multiprocessor, or the like having a pipelined structure shown in FIG. 1. According to an embodiment, the manager can be implemented with firmware working with a processor.

According to an embodiment, the memory device 150 is embodied as a non-volatile memory such as a flash memory, for example, a Read Only Memory (ROM), a Mask ROM (MROM), a Programmable ROM (PROM), an Erasable ROM (EPROM), an Electrically Erasable ROM (EEPROM), a Magnetic (MRAM), a NAND flash memory, a NOR flash memory, or the like. In another embodiment, the memory device 150 may be implemented by at least one of a phase change random access memory (PCRAM), a Resistive Random Access Memory (ReRAM), a ferroelectrics random access memory (FRAM), a transfer torque random access memory (STT-RAM), and a spin transfer torque magnetic random access memory (STT-MRAM), or the like.

Figure 7:
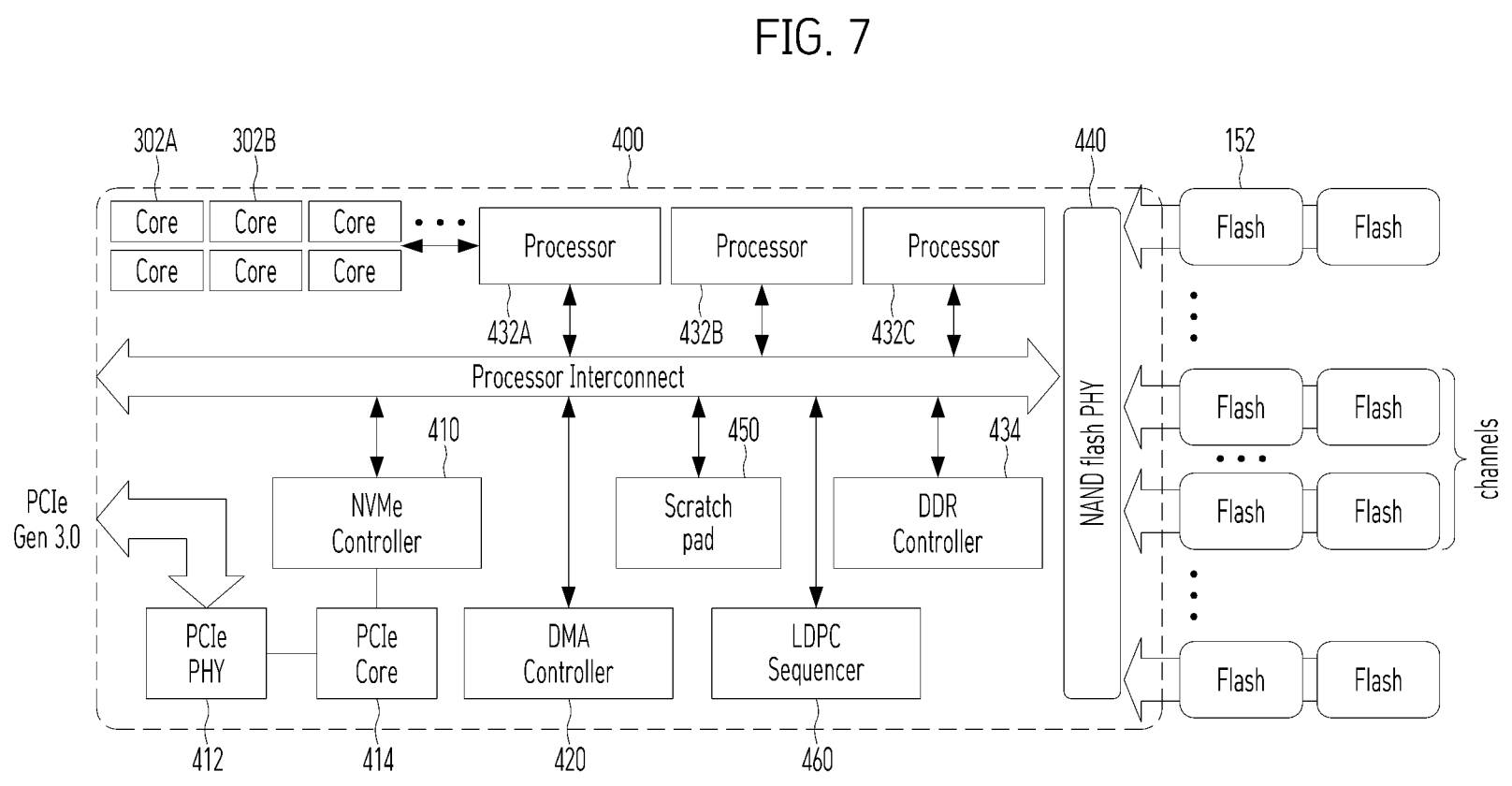

FIG. 7 illustrates a data storage system according to an embodiment of the present disclosure. FIG. 7 shows a memory system including multiple cores or multiple processors, which is an example of a data storage system. The memory system may support the Non-Volatile Memory Express (NVMe) protocol.

The NVMe is a type of transfer protocol designed for a solid-state memory that could operate much faster than a conventional hard drive. The NVMe can support higher input/output operations per second (IOPS) and lower latency, resulting in faster data transfer speeds and improved overall performance of the data storage system. Unlike SATA which has been designed for a hard drive, the NVMe can leverage the parallelism of solid-state storage to enable more efficient use of multiple queues and processors (e.g., CPUs). The NVMe is designed to allow hosts to use many threads to achieve higher bandwidth. The NVMe can allow the full level of parallelism offered by SSDs to be fully exploited. However, because of limited firmware scalability, limited computational power, and high hardware contention within SSDs, the memory system might not process a large number of I/O requests in parallel.

Referring to FIG. 7, the host, which is an external device, can be coupled to the memory system through a plurality of PCIe Gen 3.0 lanes, a PCIe physical layer 412, and a PCIe core 414. A controller 400 may include three embedded processors 432A, 432B, 432C, each using two cores 302A, 302B. Herein, the plurality of cores 302A, 302B or the plurality of embedded processors 432A, 432B, 432C may have the pipeline structure described in FIG. 1.

The plurality of embedded processors 432A, 432B, 432C may be coupled to the internal DRAM controller 434 through a processor interconnect. The controller 400 further includes a Low Density Parity-Check (LDPC) sequencer 460, a Direct Memory Access (DMA) engine 420, a scratch pad memory 450 for metadata management, and an NVMe controller 410. Components within the controller 400 may be coupled to a plurality of channels connected to a plurality of memory packages 152 through a flash physical layer 440. The plurality of memory packages 152 may correspond to the plurality of memory chips 252 described in FIG. 6.

According to an embodiment, the NVMe controller 410 included in the controller 400 is a type of storage controller designed for use with solid state drives (SSDs) that use an NVMe interface. The NVMe controller 410 may manage data transfer between the SSD and the computer CPU as well as other functions such as error correction, wear leveling, and power management. The NVMe controller 410 may use a simplified, low-overhead protocol to support fast data transfer rates.

According to an embodiment, a scratch pad memory 450 may be a storage area set by the NVMe controller 410 to temporarily store data. The scratch pad memory 450 may be used to store data waiting to be written to a plurality of memory packages 152. The scratch pad memory 450 can also be used as a buffer to speed up the writing process, typically with a small amount of Dynamic Random Access Memory (DRAM) or Static Random Access Memory (SRAM). When a write command is executed, data may first be written to the scratch pad memory 450 and then transferred to the plurality of memory packages 152 in larger blocks. The scratch pad memory 450 may be used as a temporary memory buffer to help optimize the write performance of the plurality of memory packages 152. The scratch pad memory 450 may serve as intermediate storage of data before the data is written to non-volatile memory cells.

The Direct Memory Access (DMA) engine 420 included in the controller 400 is a component that transfers data between the NVMe controller 410 and a host memory in the host system without involving host's processor. The DMA engine 420 can support the NVMe controller 410 to directly read or write data from or to the host memory without intervention of the host's processor. According to an embodiment, the DMA engine 420 may achieve or support high-speed data transfer between a host and an NVMe device, using a DMA descriptor that includes information regarding data transfer such as a buffer address, a transfer length, and other control information.

The Low Density Parity Check (LDPC) sequencer 460 in the controller 400 is a component that performs error correction on data stored in the plurality of memory packages 152. Herein, an LDPC code is a type of error correction code commonly used in a NAND flash memory to reduce a bit error rate. The LDPC sequencer 460 may be designed to immediately process encoding and decoding of LDPC codes when reading and writing data from and to the NAND flash memory. According to an embodiment, the LDPC sequencer 460 may divide data into plural blocks, encode each block using an LDPC code, and store the encoded data in the plurality of memory packages 152. Thereafter, when reading the encoded data from the plurality of memory packages 152, the LDPC sequencer 460 can decode the encoded data based on the LDPC code and correct errors that may have occurred during a write or read operation. The LDPC sequencer 460 may correspond to the ECC module 266 described in FIG. 6.

In addition, although FIGS. 6 and 7 illustrate an example of a memory system including a memory device 150 or a plurality of memory packages 152 capable of storing data, the data storage system according to an embodiment of the present disclosure may not be limited to the memory system described in FIGS. 6 and 7. For example, the memory device 150, the plurality of memory packages 152, or the data storage device controlled by the controllers 130, 400 may include non-volatile or non-volatile memory devices. In FIG. 7, it is described that the controller 400 can performs data communication with the host 102 externally placed from the memory system (see FIG. 6) through an NVM Express (NVMe) interface and a PCI Express (PCIe). In an embodiment, the controller 400 may perform data communication with at least one host through a protocol such as a Compute Express Link (CXL).

Additionally, according to an embodiment, an apparatus and method for performing distributed processing or allocation/reallocation of the plurality of instructions in a controller including multiple processors of the pipelined structure according to an embodiment of the present disclosure can be applicable to a data processing system including a plurality of memory systems or a plurality of data storage devices. For example, a Memory Pool System (MPS) is a very general, adaptable, flexible, reliable and efficient memory management system where a memory pool such as a logical partition of primary memory or storage reserved for processing a task or group of tasks could be used to control or manage a storage device coupled to the controller. The controller including multiple processors in the pipelined structure can control data and program transfer to the memory pool controlled or managed by the memory pool system (MPS).

FIG. 8 illustrates a method for operating a data storage system according to an embodiment of the present disclosure.

Referring to FIG. 8, the method of operating the data storage system includes receiving a command input from a host (operation 502), generating a plurality of instructions having dependencies based on the command (operation 504), allocating the plurality of instructions to pipelined multiple processors in stages (operation 506), reallocating at least some of the plurality of instructions based on the dependencies to the multi processors when the number of instructions which has been allocated to the multi processors is greater than a first threshold (operation 508), and carrying out the plurality of instructions through the pipelined multiple processors (operation 510). According to an embodiment, the reallocating (operation 508) can include reallocating, when a number of second instructions allocated to a second processor of the multiple processors becomes a first threshold or greater, at least one of the second instructions to a first processor of the multiple processors.

The operation 510 of carrying out the plurality of instructions through the multiple processors can include, when the multiple processors are N number of processors, where N is equal to or greater than 2, an operation of carrying out, through each of the processors, one or more instructions that are allocated to the processor among the plural instructions according to N number of stages having the dependency. When the multiple processors have a pipeline structure, a time for executing and waiting instructions allocated to each stage may be determined based on the dependencies.

The operation 508 may include checking N number of queues each configured to enqueue therein one or more instructions allocated to a corresponding processor of the N number of processors, and determining an operating state of the corresponding processor based on a result of the checking. For example, the determining the operating state may include an operation of determining an instruction level of the corresponding processor: as high when a number of the instructions allocated to the corresponding processor is the first threshold or greater, as medium when the number of the instructions allocated to the corresponding processor is a second threshold or greater and less than the first threshold, and as low when the number of the instructions allocated to the corresponding processor is less than the second threshold (see FIG. 2).

According to an embodiment, the operation 508 can further include, when the second processor corresponds to a subsequent stage to a stage corresponding to the first processor among the N number of stages, an operation of reallocating at least a selected second instruction of second instructions, which have been allocated to the second processor, to the first processor when the instruction level of the first processor is low, so that the instruction level of the first processor becomes medium. For example, referring to FIGS. 3 and 9, when instructions allocated to the plurality of processors are reallocated and an instruction level of a specific processor is excessively higher or lower than those of other processors, instruction offloading including instruction reallocation may achieve or ensure substantially uniform workloads on the N processors.

In addition, according to an embodiment, the operation 508 may include an operation of selecting and reallocating an instruction, which has been allocated to the second processor and to which no instructions have the dependency, to the first processor. Herein, the selected instruction among the instructions waiting on the second processor may have a dependency on at least one of first instructions waiting on the first processor. Referring to FIGS. 4 and 5, the sixth instruction Instr_S2_3, to which no instructions have the dependency, may be selected with the priority for stage change. That is, the at least one of second instructions is preferentially selected among the second instructions allocated to the second processor, when the selected second instruction has the dependency to one of the first instructions enqueued in a first queue corresponding to the first processor among the N number of queues but no instructions have the dependency to the selected second instruction. According to an embodiment, the selected second instruction is an earliest second instruction to be carried out among the second instructions.

According to an embodiment, the method can further include, when at least one instruction which has been allocated to the second processor is reallocated to the first processor, another instruction having a dependency on the at least one reallocated instruction can be reallocated from the third processor to the second processor. That is, the method may further include an operation of reallocating, to the second processor, and after the reallocating of the selected second instruction, a third instruction having the dependency to the selected second instruction, after the reallocating of the at least one of second instructions. Because stage changes could be determined based on dependencies, the stage changes for plural instructions chained in response to dependencies can be consecutively performed.

According to an embodiment, the operation 506 of allocating the plurality of instructions to multiple processors having the pipelined structure in stages can include an operation of determining, based on maximum numbers of instructions that can be carried out by the respective multiple processors, each size of queues each configured to enqueue therein one or more instructions allocated to a corresponding processor of the multiple processors; and an operation of allocating the plural instructions to the multiple processors based on the determined size. According to an embodiment, the number of instructions to be performed by each of the multiple processors may be adjusted to be less than or equal to the maximum number of instructions.

Figure 9:
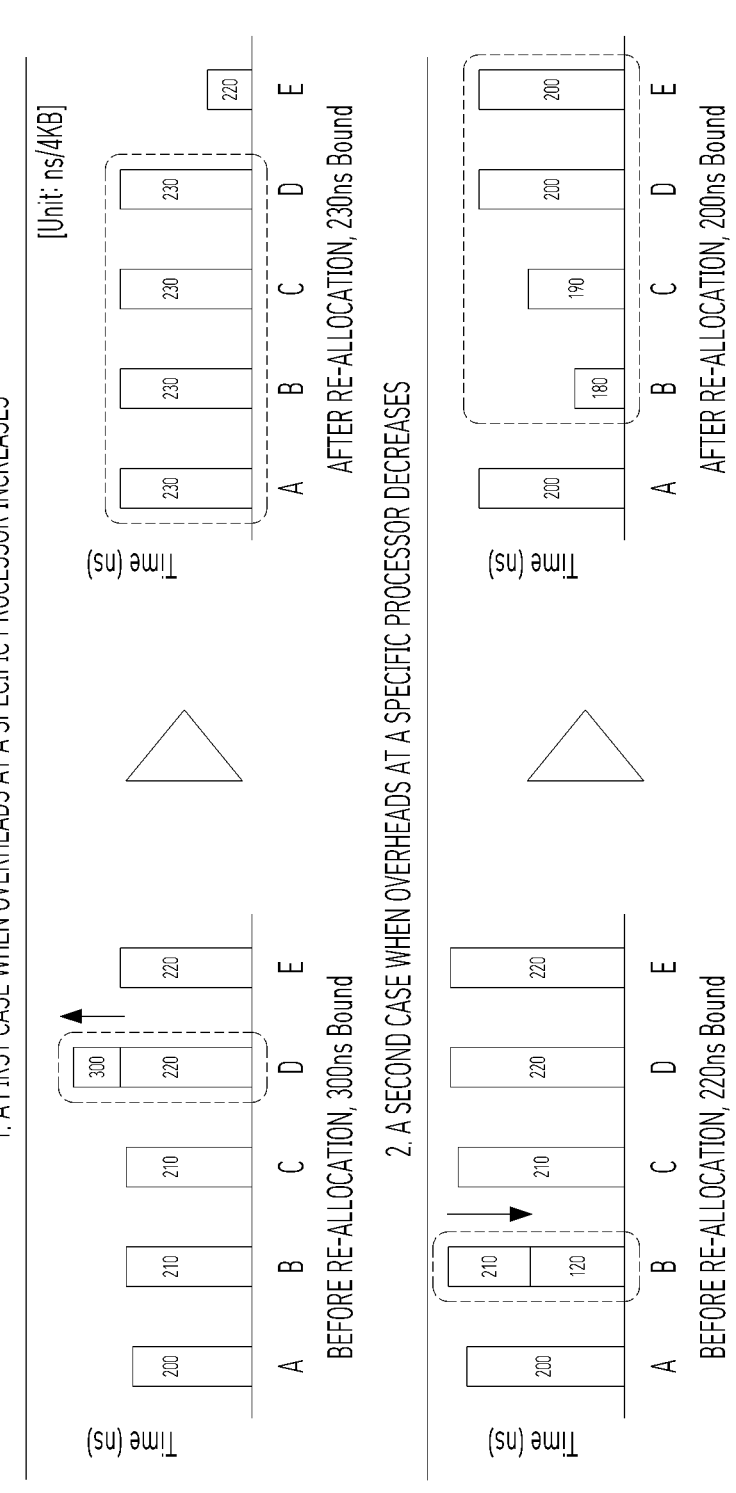
FIG. 9 illustrates an effect of reallocation according to an embodiment of the present disclosure.

FIG. 9 illustrates an effect of reallocation according to an embodiment of the present disclosure. Specifically, FIG. 9 illustrates two example cases of occurring instruction offloading after workloads corresponding to instructions allocated to five processors A, B, C, D, E are substantially uniformly assigned.

Referring to a first case shown in FIG. 9, an overhead for a fourth processor D among the five processors (e.g., GWL event) increases. If the overhead of the fourth processor D increases, the memory system can perform instruction offloading according to an embodiment of the present disclosure. Through the instruction offloading, overheads of other processors A, B, C, E could be increased but the overhead of the fourth processor D could be decreased or suppressed. Provided that an execution time of each instruction is the same, a total execution times on instructions allocated to each processor could show overheads of the five processors A, B, C, D, E. If the overheads of the fourth processor D increases, by 80 ns, from 220 ns to 300 ns, the instruction offloading could be performed so that overheads of multiple other processors A, B, C, E could be increased and, then, the overheads of the five processors A, B, C, D, E are equalized as 230 ns.

Referring to a second case shown in FIG. 9, an overhead of a second processor B (e.g., ZNS write) decreases. If the overhead of the second processor B is reduced, the memory system can perform instruction offloading according to an embodiment of the present disclosure. Through the instruction offloading, overheads of other processors A, C, D, E could be reduced and overhead reduction of the second processor B could be suppressed. Provided that the overhead of the second processor B decreases by 90 ns from 210 ns to 120 ns, the instruction offloading could reduce a difference in overloads of the five processors A, B, C, D, E so that the overheads of the five processors could be adjusted in a range of 180 ns to 200 ns.

As above described, a plurality of instructions allocated to pipelined multiple processors according to an embodiment of the present disclosure can be reallocated in response to operating states and dependencies, thereby improving data input/output (I/O) performance of the data storage system.

Further, the data storage system according to an embodiment of the present disclosure can adjust loads applied to each of multiple processors according to an improved instruction allocation method, thereby improving data input/output performance of the data storage system including a memory device or a storage device.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A data storage system comprising a controller comprising pipelined multiple processors, wherein the controller is configured to:

generate plural instructions based on one of a read command, a write command, and an erase command, input from an external device, wherein the plural instructions are for controlling a data input/output operation performed within at least one storage device and at least one instruction among the plural instructions has dependency on one or more other instructions among the plural instructions;

allocate the plural instructions to the pipelined multiple processors in stages, wherein the dependency requires for allocation of the plural instructions that the one or more other instructions are executed at an earlier stage than the at least one instruction executed at a later stage; and reallocate, when a number of second instructions allocated to a second processor of the pipelined multiple processors becomes a first threshold or greater, at least one of the second instructions to a first processor of the multiple processors, wherein the controller determines based on the dependency a correct order of processing of the plural instructions to avoid bottlenecks in the processing.

2. The data storage system according to claim 1, wherein the pipelined multiple processors comprises N number of processors, where N is equal to or greater than 2, and wherein the N number of processors are individually configured to carry out one or more instructions, allocated thereto, among the plural instructions according to N number of stages having the dependency.

3. The data storage system according to claim 2, wherein the controller further comprises a task monitoring circuitry configured to:

check N number of queues each configured to enqueue therein one or more instructions allocated to a corresponding processor of the N number of processors, and determine an operating state of each of the N number of processors based on a result of the checking.

4. The data storage system according to claim 3, wherein the task monitoring circuitry determines the operating state based on an instruction level of the corresponding processor as one of:

high when a number of the instructions allocated to the corresponding processor is the first threshold or greater, medium when the number of the instructions allocated to the corresponding processor is a second threshold or greater and less than the first threshold, and low when the number of the instructions allocated to the corresponding processor is less than the second threshold.

5. The data storage system according to claim 4, wherein the second processor corresponds to a subsequent stage to a preceding stage corresponding to the first processor among the N number of stages, and wherein the task monitoring circuitry is configured to reallocate the at least one of second instructions, which have been allocated to the second processor, to the first processor when the instruction level of the first processor is low.

6. The data storage system according to claim 5, wherein the task monitoring circuitry is configured to preferentially select a second instruction among the second instructions allocated to the second processor, when the selected second instruction has the dependency to one of the first instructions enqueued in a first queue corresponding to the first processor among the N number of queues but no instructions has the dependency to the selected second instruction.

7. The data storage system according to claim 6, wherein the selected second instruction is an earliest second instruction to be carried out among the second instructions.

8. The data storage system according to claim 5, wherein the task monitoring circuitry is further configured to, after reallocating the at least one of second instructions, reallocate a third instruction from a third processor to the second processor, the third instruction having the dependency to the at least one of second instructions.

9. The data storage system according to claim 1, wherein the controller allocates the plural instructions by:

determining, based on maximum numbers of instructions that can be carried out by the respective multiple processors, each size of queues each configured to enqueue therein one or more instructions allocated to a corresponding processor of the pipelined multiple processors; and allocating the plural instructions to the pipelined multiple processors based on the determined size.

10. The data storage system according to claim 1, wherein the first processor has a higher stage than the second processor, and wherein the controller is configured to, for the reallocating, preferentially select the at least one of second instructions, a number of which is less than a difference between the first threshold and a second threshold lower than the first threshold.

11. The data storage system according to claim 1, wherein the controller is further configured to carry out tasks of the plural instructions based on an allocated sequence at each of the pipelined multiple processors and the dependency between the plural instructions.

12. A method for operating a data storage system, the method comprising:

receiving one of a read command, a write command, and an erase command input from a host;

generating plural instructions according to the command, wherein the plural instructions are for controlling a data input/output operation performed within at least one storage device and at least one instruction among the plural instructions has dependency on one or more other instructions among the plural instructions;

allocating the plural instructions to pipelined multiple processors in stages, wherein the dependency requires for allocation of the plural instructions that the one or more other instructions are executed at an earlier stage than the at least one instruction executed at a later stage;

reallocating, when a number of second instructions allocated to a second processor of the multiple processors becomes a first threshold or greater, at least one of the second instructions to a first processor of the multiple processors; and carrying out tasks of the plural instructions based on an allocated sequence at each of the pipelined multiple processors and the dependency between the plural instructions, wherein a correct order of processing of the plural instructions based on the dependency avoids bottlenecks in the processing.

13. The method according to claim 12, wherein the pipelined multiple processors comprise N number of processors, where N is equal to or greater than 2, and wherein the carrying out the plural instructions comprises carrying out, through each of the processors, one or more instructions that are allocated to the processor among the plural instructions according to N number of stages having the dependency.

14. The method according to claim 13, wherein the reallocating the at least one instruction comprises:

checking N number of queues each configured to enqueue therein one or more instructions allocated to a corresponding processor of the N number of processors; and determining an operating state of each of the N number of processors based on a result of the checking.

15. The method according to claim 14, wherein the determining the operating state comprises determining an instruction level of the corresponding processor as one of:

high when a number of the instructions allocated to the corresponding processor is the first threshold or greater, medium when the number of the instructions allocated to the corresponding processor is a second threshold or greater and less than the first threshold, and low when the number of the instructions allocated to the corresponding processor is less than the second threshold.

16. The method according to claim 15, wherein the second processor corresponds to a subsequent stage to a preceding stage corresponding to the first processor among the N number of stages, and wherein the at least one of second instructions, which have been allocated to the second processor, is reallocated to the first processor when the instruction level of the first processor is low, until the instruction level of the first processor becomes medium after the reallocating.

17. The method according to claim 16, wherein the at least one of second instructions is preferentially selected among the second instructions allocated to the second processor, when the selected second instruction has the dependency to one of the first instructions enqueued in a first queue corresponding to the first processor among the N number of queues but no instructions have the dependency to the selected second instruction.

18. The method according to claim 17, wherein the selected second instruction is an earliest second instruction to be carried out among the second instructions.

19. The method according to claim 16, further comprising reallocating, to the second processor, a third instruction having the dependency to the selected second instruction, after the reallocating of the at least one of second instructions.

20. The method according to claim 12, wherein the allocating the at least one of the second instructions includes:

determining, based on maximum numbers of instructions that can be carried out by the respective multiple processors, each size of queues each configured to enqueue therein one or more instructions allocated to a corresponding processor of the multiple processors; and allocating the plural instructions to the multiple processors based on the determined size.

* * * * *